United States Patent

Houseknecht

[15] 3,649,317
[45] Mar. 14, 1972

[54] SHRINKAGE COMPENSATING CEMENT

[72] Inventor: Theodore M. Houseknecht, Emmaus, Pa.
[73] Assignee: Fuller Company
[22] Filed: Nov. 12, 1970
[21] Appl. No.: 89,040

[52] U.S. Cl. ............................ 106/90, 106/94, 106/97, 106/112, 106/308 Q, 106/288 B, 106/314
[51] Int. Cl. .............................................. C04b 13/22
[58] Field of Search ............ 106/86, 314, 90, 94, 97, 112, 106/308 Q, 288 B

[56] References Cited

UNITED STATES PATENTS

| | | | |
|---|---|---|---|
| 3,303,037 | 2/1967 | Klein | 106/314 |
| 3,251,701 | 5/1966 | Klein | 106/314 |
| 3,197,323 | 7/1965 | Rehmar | 106/314 |
| 3,027,266 | 3/1962 | Wikne | 106/86 |
| 3,021,291 | 2/1962 | Thiessen | 106/90 |
| 2,521,073 | 9/1950 | Ludwig | 106/94 |
| 2,465,278 | 3/1949 | Schenker et al. | 106/314 |

Primary Examiner—James E. Poer
Assistant Examiner—W. T. Scott
Attorney—Jack L. Prather and Frank H. Thomson

[57] ABSTRACT

A shrinkage compensating cement which includes a composition of Portland cement and a reactive compound which expand upon contact with water. The reactive compound is coated with an alkali soluble, water insoluble material in order to delay the time within which the reactive compound will expand. Quicklime or Plaster of Paris are examples of reactive compounds which may be used.

10 Claims, No Drawings 3,649,317

SHRINKAGE COMPENSATING CEMENT

BACKGROUND OF THE INVENTION

This invention relates to shrinkage compensating cement and in particular to a shrinkage compensating hydraulic cement.

Conventional concrete made with Portland cement usually shrinks during the curing process. The shrinkage is usually attributed to the chemical combination of the mix water and cement grains which cause a reduction in the volume of the concrete. Virtually all concrete made from Portland cement will contract to some degree. This shrinkage can result in surface cracking, and if the tensile strength of the concrete is exceeded, the cracking may be deep into the concrete.

In order to overcome the cracking which can result from the shrinkage of the concrete, shrinkage compensating or expansive cements have been developed. Such expansive cements are used in various applications. One such application is slabs of concrete. The expansion of the cement causes pressure to be applied on the forms for the slab after the concrete has begun to cure and a compressive force is maintained on the concrete even after the forms are removed. Because concrete has relatively high compressive strength, as long as the concrete is held in compression, the likelihood that cracks will develop is substantially reduced.

Expansive cements have also been used in prestressed concrete applications. The expansive cement is used to bring about self-stressing of steel reinforcing members contained within the concrete. Expansive cements are particularly useful for three-dimensional prestressing.

Expansive or shrinkage compensating cements are known and one such cement is set forth in U.S. Pat. No. 3,155,526. The expansive cement described in this patent is a composition including normal Portland cement clinker mixed with a special clinker containing a high percentage of alumina. The special clinker may be mixed in amounts from 10 to 20 percent with the Portland cement for producing varying degrees of expansion. This expansive cement has the disadvantage that a "foreign" substance is added to the concrete.

Other expansive cements have been developed, but these also have the disadvantage that a foreign substance is added to the concrete. These prior expansive cements requiring special ingredients can be expensive to manufacture. The special ingredients require close control and proportioning. Even with such close control, the expansion is often erratic and unpredictable.

As referred to herein, the term "shrinkage compensating cement" shall include cements in which there is a reduction in the amount of shrinkage which a conventional cement undergoes during curing, cements which neither expend nor shrink during curing and cement which expands during curing.

SUMMARY

It is the principal object of this invention to provide a shrinkage compensating cement which is inexpensive to manufacture and overcomes the disadvantages of prior shrinkage compensating cements.

It is another object of this invention to provide a shrinkage compensating cement which does not add any foreign substances to the cured cement.

It is a further object of this invention to provide a novel shrinkage compensating cement, the composition of which can be controlled to make a concrete which either expands or does not shrink or expand.

In general, the foregoing and other objects of this invention will be carried out by providing a composition comprising Portland cement and a reactive compound which will expand upon contact with water; said reactive compound being coated with an alkali soluble, water insoluble material. The objects of this invention will also be carried out by providing the method of producing a shrinkage compensating cementitious material comprising the steps of coating a reactive compound which will expand upon contact with water with an alkali soluble, water insoluble material, and blending the coated reactive compound with Portland cement.

DESCRIPTION OF THE PREFERRED EMBODIMENT

Portland cement normally shrinks as it is cured, and it would be desirable to overcome this shrinking characteristic. By the present invention it has been found that such shrinkage can be compensated for by the addition of an expansive agent to the Portland cement. Since water is added to the cement and aggregate in the making of concrete, the expansive agent is preferably reactive upon contact with water. Upon reaction with water, the expansive agent should not add a foreign substance to the concrete.

One such expansive material is quicklime (CaO). When water is added to quicklime, it expands and increases in volume by about 20 percent. The quicklime plus water forms calcium hydroxide ($CaO + H_2O \rightarrow Ca(OH)_2$) which is a normal hydration product of calcium silicates, which comprise 70 percent to 80 percent of commercial Portland cement. Thus, the addition of the quicklime to the Portland cement will not result in the addition of any foreign substances to the finished concrete. The addition of the quicklime may be beneficial to the composition as the calcium hydroxide will react with certain forms of silica to form cementitious calcium silicate. This may add durability to the finished concrete.

A second material which may be used as an expansive agent is Plaster of Paris ($CaSO_4 \cdot \frac{1}{2} H_2O$). When mixed with water, Plaster of Paris will expand and produce gypsum ($CaSO_4 \cdot \frac{1}{2} H_2O + 1\frac{1}{2} H_2O \rightarrow CaSO_4 \cdot 2H_2O$). Since gypsum is often added to Portland cement, the addition of Plaster of Paris to Portland cement will not add any foreign substances to the finished concrete. However, the Plaster of Paris will expand only about one-half the amount that the same volume of quicklime will expand. This factor must be considered in determining the amount of expansive agent to be added to the Portland cement. Both quicklime and Plaster of Paris are inexpensive when compared to prior expansive cement additives.

In order for an expansive cement to be useful, it should not expand as soon as water and aggregate are added. However, most of the expansion should occur within 24 to 48 hours after the concrete has been mixed. After such initial 24 to 48-hour period, the concrete should be dimensionally stable and substantially no further expansion or subsequent shrinkage should occur. Because the expansive agents which I have chosen expand upon contact with water, it is necessary to delay contact between the expansive agent and water in order to insure that the greater part of the expansion takes place within the initial 24 to 48-hour curing period. By the present invention, the expansive material is coated with a water insoluble material. Such coating will prevent the water from contacting the expansive agent until such coating has been dissolved and thereby delay the expansion of the cement.

Since alkalis are naturally formed when water is added to Portland cement, it has been found to be desirable to make the coating alkali soluble. When water is added to the cement, the alkalis formed will dissolve the coating. As the coating is dissolved, the water in the cement will contact the expansive agent thereby expanding the cement.

A coating material which was found to be useful is a wood resin commercially available under the trademark "Vinsol." This material meets the qualifications of being alkali soluble and water insoluble and has the further advantage of being able to be placed in solution with organic liquids. The ability to be placed in solution with an organic liquid permits easy application of the coating to the expansive material.

It has been found that the coating may be applied by placing it in solution with an organic liquid, such as denatured alcohol, and the reactive compound being stirred in the solution. The coated reactive compound is then dried. Other techniques for applying the coating to the reactive compound may include spraying the coating solution onto the reactive compound. In laboratory applications, the immersion of the reactive compound in the solution of coating material and organic liquid followed by filtration and drying proved to be the most successful technique for applying the coating material to the reactive compound. The amount of coating applied to the reactive compound may be varied by increasing or decreasing the amount of coating placed in solution with the organic liquid.

Experimentation with the invention was carried out by stirring the expansive compound in a solution of denatured alcohol and "Vinsol" for five minutes followed by suction filtration and drying at 105° C. The coated reactive compound was blended with Portland cement in amounts up to 20 percent by weight of the finished product.

Test specimens were of neat cement paste, i.e., no aggregate was added. Water content of the test specimens was kept as close to 25 percent as possible. After the specimens were molded, they were moist-air cured for one day, then the mold forms removed and length measurements taken. Subsequent length measurements were made at one-day intervals. Identical specimens were made without the expansive agent added for purposes of comparison.

Three factors affected the expansion of the cement. Those factors were (1) the amount of reactive agent added to the Portland cement, (2) the thickness of coating, and (3) whether moist-air cured or water-submersed cured.

The amount of the coated reactive compound blended with the Portland cement can be used to control the amount of expansion of the cured concrete. It has been found that up to 20 percent by weight of the finished composition may be coated reactive compound. Using the same coating thickness, a composition of Portland cement and 10 percent by weight of finished product coated reactive compound expanded about 0.19 percent after one day, about 0.20 percent after two days and about 0.23 percent after 12 days while a composition of Portland cement and 5 percent by weight of finished product coated reactive compound expanded about 0.07 percent after one day, about 0.08 percent after two days and about 0.13 percent after 12 days. Each of these test specimens was cured in a similar manner. No reversal of the expansion was noted after 20 days when measurements were discontinued. It became apparent that a higher percentage of expansive agent produced a greater expansion, most of which took place over a shorter period of time.

The thickness of the coating also affects the amount of expansion of the cement. In experimentation, the coating thickness was varied by dissolving greater or lesser amounts of the resin in alcohol. The range of coating in solution ran from 1 percent to 50 percent. In all cases, as the strength of the coating solution decreased, and hence the thickness of the coating decreased, the ultimate linear expansion of the cured cement increased. In addition, the thicker the coating, the slower the rate of expansion. This is believed to be attributable to the length of time it takes to dissolve the coating before the water contacts the reactive compound.

Using an equal amount of coated reactive compound blended with Portland cement, a comparison of coating thickness was made. A solution of 10 percent "Vinsol" and 90 percent denatured alcohol resulted in an expansion of about 0.13 percent after one day, about 0.15 percent in two days and about 0.19 percent in 12 days. A solution of 1 percent "Vinsol" and 99 percent denatured alcohol resulted in an expansion of about 0.26 percent in one day, about 0.27 percent in two days and about 0.32 percent in 12 days. Again, no tendency to shrink was observed after 20 days.

Through experimentation, it was also found that greater and more rapid expansion occurs when the cement is water-submersed cured than when moist-air cured. This is believed to be attributable to the availability of enough water in the water-submersed curing to react with all the expansive compound. With a 10 percent by weight reactive compound composition, water-cured cement expanded about 0.18 percent after one day, about 0.20 percent after two days and about 0.23 percent after 12 days while the same moist-air cured cement expanded about 0.03 percent after one day, about 0.05 percent after two days and about 0.15 percent after 12 days. With a 7 percent by weight reactive compound composition, water-cured cement expanded about 0.10 percent after one day, about 0.11 percent after two days and about 0.17 percent after 12 days while the same moist-air cured cement expanded about 0.01 percent after one day, about 0.02 percent after two days and about 0.09 percent after 12 days. Not only did the water cured cement expand more than the moist-air cured cement, but also the expansion took place more rapidly.

From the foregoing, it should be apparent that the amount of expansion can be controlled by controlling the thickness of the coating and the percentage of reactive compound added to the Portland cement and whether water-submersed cured or moist-air cured. These factors can also be used to control the rate of expansion. The amount to be added and the thickness of coating can be determined for any particular application through routine experimentation.

From the foregoing, it should be apparent that the objects of this invention have been carried out. A skrinkage compensating cement has been provided which is inexpensive to manufacture. The reactive compound is readily available at low cost. The coating material is readily available at a low cost and is inexpensively applied. The expanding agent does not result in the addition of foreign substances to the finished concrete. The amount of expansion or contraction of the finished concrete can be controlled by controlling the expansive agent added to the Portland cement.

It is intended that the foregoing be merely that of a preferred embodiment and that the invention be limited solely by that which is within the scope of the appended claims.

I claim:

1. A composition consisting essentially of Portland cement and a reactive compound which will expand upon contact with water; said reactive compound being coated with an alkali soluble, water insoluble material and being present in an amount sufficient to compensate for shrinkage during the curing of said cement.

2. The composition of claim 1 wherein said coating material is soluble in an organic liquid.

3. The composition of claim 1 wherein said reactive compound is quicklime.

4. The composition of claim 3 wherein the coated reactive compound is blended with said Portland cement in an amount up to about 20 percent by weight of the composition.

5. The composition of claim 1 wherein the coated reactive compound is blended with said Portland cement in an amount up to about 20 percent by weight of the composition.

6. The composition of claim 1 wherein said reactive compound is Plaster of Paris.

7. The composition of claim 6 wherein the coated reactive compound is blended with said Portland cement in an amount up to about 20 percent by weight of the composition.

8. The method of producing a shrinkage compensating cementitious material comprising the steps of coating a reactive compound which will expand upon contact with water with an alkali soluble, water insoluble material, and blending the coated reactive compound with Portland cement.

9. The method of claim 8 wherein the coated reactive compound is blended with the Portland cement in an amount up to about 20 percent by weight of the cementitious material.

10. The method of claim 9 wherein said reactive compound is coated with an alkali soluble, water insoluble solution by making a solution of an organic liquid and the alkali soluble, water insoluble material, applying said solution to said reactive compound and drying the coated reactive compound.

* * * * *